No. 620,679. Patented Mar. 7, 1899.
J. W. SHRYOCK.
APPARATUS FOR REMOVING ELECTRICITY FROM THE HUMAN SYSTEM.
(Application filed July 21, 1898.)
(No Model.)
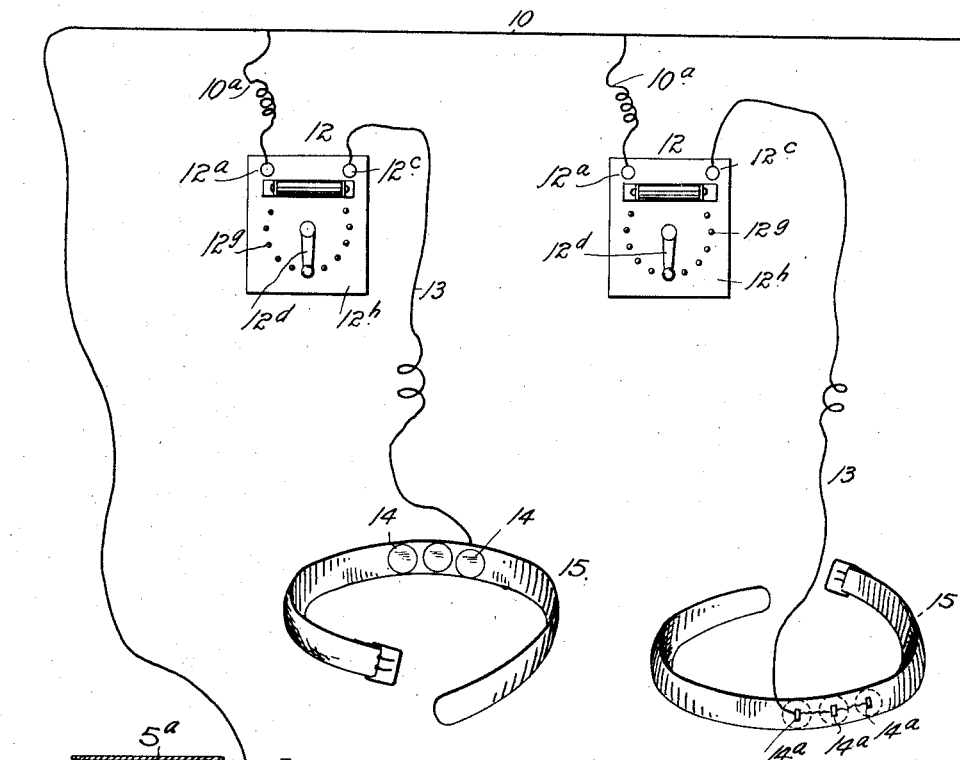
FIG. 1.
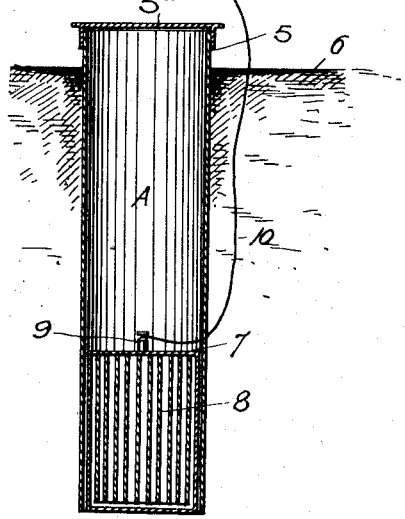
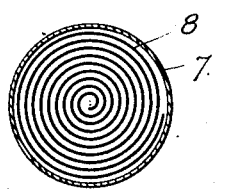
FIG. 2.
FIG. 3.
Witnesses
Inventor
James W. Shryock
By his Attorney

UNITED STATES PATENT OFFICE.

JAMES W. SHRYOCK, OF PUEBLO, COLORADO.

APPARATUS FOR REMOVING ELECTRICITY FROM THE HUMAN SYSTEM.

SPECIFICATION forming part of Letters Patent No. 620,679, dated March 7, 1899.

Application filed July 21, 1898. Serial No. 686,535. (No model.)

*To all whom it may concern:*

Be it known that I, JAMES W. SHRYOCK, a citizen of the United States of America, residing at Pueblo, in the county of Pueblo and State of Colorado, have invented certain new and useful Improvements in Apparatus for Removing Electricity from the Human System; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an apparatus for removing electricity from the human system.

It has been demonstrated by practical application that electricity can be produced directly from the consumption of fuel without the intervention of boiler, engine, or dynamo. Nature has been producing the same result on a small scale in the animal kingdom ever since animal life came into existence. It is a fact recognized in physics that the heat of our bodies is the result of combustion of the fuel taken into the system through the stomach and lungs, the carbonaceous or solid fuel entering through the digestive apparatus and oxygen or the gaseous fuel entering through the lungs. As evidence that oxygen forms an important part of the fuel producing animal heat we have only to shut out from the lungs the supply of oxygen for the short space of a few minutes and the spark of life will go out and the body soon after lose its warmth. In the remote cells of the organism the oxygen and nutriment from the food we eat unite and in the process of combustion generate heat and electricity. The amount of heat and electricity produced depends upon the quantity of oxygen and carbon consumed. The quantity of oxygen and carbon required to produce the necessary animal heat and sustain life depends wholly upon climatic conditions. Nature has wisely provided for these requirements. In tropical climates, where but little animal heat is required, nature generously provides an abundance of vegetable food low in carbon, while the atmosphere on account of the high temperature at 100° contains a comparatively small quantity of oxygen. In temperate climates the supply of oxygen and carbon varies with the season. In the summer vegetables prevail, while in winter animal and heat-producing foods are consumed, and with the thermometer at 32° a cubic foot of air contains a greater quantity of oxygen. In the frigid zone, where the thermometer registers 50° below zero and the solid food of the native is exclusively carbon—viz., fat and oil—nature provides a much greater quantity of oxygen per cubic foot with which to consume the large amount of carbon and produce the high degree of animal heat necessary to sustain life in that extreme temperature. It must of course be understood that the proportion of gases in pure air never varies and has been found to be the same at an altitude of twenty-five thousand feet as at sea-level. The quantity per cubic foot varies with the temperature on account of contraction and expansion, as above stated.

That portion of the human family living in a state of nature free from the artificial necessities of civilized life breathes pure air night and day, and asleep or awake they live near to the ground, permitting the electricity produced by their physical economy to escape to the earth. They do not patronize drug stores nor a medical fraternity. The female of this portion of the human family at childbirth dispenses with the services of a physician, a trained nurse, and several weeks in bed. The inhabitants of rural districts, the barefooted boy, and the peasant who works in his fields barefooted seldom require the services of a physician and are singularly free from contagious diseases. The civilized portion of the human family sleep in insulated beds, breathe impure air in close rooms at night, and during the day insulate themselves from the earth with shoes and stockings and insulated floors covered with insulating material in the shape of carpets, preventing the escape of the electricity from their bodies except by accident. Living in an abnormal state they suffer from abnormal results (denominated "disease") and their accompaniments—doctors and remedies.

Electric science informs us that "wherever electricity is observed, in whatever form, it is accompanied by heat, or, more correctly speaking, a quantity of electrical force in making itself evident to our senses produces heat. The converse is equally true—wherever heat is observed it is accompanied by electricity, or a quantity of it produces electrical force." Heat is positive and cold is negative. Electricity always flows from the positive to the negative or from a positive or high potential to a negative or lower potential. The body is in a positive condition and produces positive electricity. The earth is negative electrically. If the body is connected with the earth by a metallic conductor, there is a current of electricity passes from the body to the earth. This flow of electricity ceases when the consumption of oxygen and carbon ceases. A corpse produces no electricity. If the metallic conductor entering the earth is connected with the proper metallic element containing sufficient conducting area or surface, (electricity travels on the surface only,) rendered negative to a high degree by surrounding it with a low degree of temperature, the flow of electricity from the body will be augmented and will reach a maximum, provided the resistance of the metallic conductor to the passage of the current is minimum. That there is a flow of dynamic electricity under these conditions is susceptible of proof, first, by placing a delicate astatic galvanometer in circuit between the body and the earth; second, by applying grease saturated with sulfur to the skin and using a connecting-disk of plain copper connected to the foot-wire leading to the negative element, (when applied over night it results in a white spot on the skin the size and shape of the disk, with black rays extending toward it from every direction. This shows sufficient electrolytic action to produce a black pigment, possibly the black oxid of copper;) and, third, if a corroded metallic disk is used, such as rusty steel or iron, in place of the copper, the corrosion offers a resistance to the passage of the current, irritating the skin, producing a spot the size of the connecting-disk used, and if applied on the spot nightly for several successive nights it will cause a sore with every evidence of being a burn, evidently the result of the electric spark produced by the resistance offered to the passing of the current by the imperfect connection caused by the corroded surface of the connecting-disk. These results are evidence of the presence of dynamic electricity in the body and its flow from the body, because the conditions of application and the law of electricity make it impossible for a current to flow toward the body. In nature, in animal or man, this electricity passes to the ground through the feet. My instrument is for the purpose of restoring this law of nature to civilized man, to be used jointly with an abundant supply of fresh air, which places the physical being under normal conditions, producing normal results.

By practice I found that a very low temperature produced a potential in the instrument much lower than the potential of the body, relieving the body of its electricity to a maximum, while with a low temperature of the atmosphere the amount of oxygen per cubic foot being excessive causes the organism to become too active, resulting in larger quantities of oxygen being supplied to the blood than necessary for normal work and normal results, producing a state of exhaustion when applied for several successive days. To overcome this and regulate the amount of oxygen consumed and the amount of electricity removed from the body under varying temperatures, (which should not exceed the amount escaping by going barefooted on moist earth,) I introduce a resistance between the body and the instrument. In practice I found this resistance to amount to one ohm for every 2.22° fall of temperature for a person of very low vitality or nerve force to 4.44° for a robust person, over a thermometrical range of 60° above zero to 40° below. This resistance I divide into nine divisions, from one to nine in mathematical progression, making a total resistance of forty-five ohms. With this division and amount of resistance it is possible to keep the difference of potential of the body and instrument at a normal point at all seasons of the year and in any climate or altitude. This resistance or regulator is an absolute necessity on account of the various degrees of vitality offered for treatment.

The use of the instrument in a close room or a room poorly ventilated results in an aggravation of the abnormal condition from which the user may be suffering for physiological reasons. In twenty-four hours we breathe over twenty thousand times. Science has proven that we consume twice as much air when asleep as in waking hours. If the air of the sleeping-room is impure, the impurity is increased by the breath of the sleeper, and at each breath the blood fails to receive its due proportion of the life-giving principle of the atmosphere—oxygen—so essential to the performance of its normal function. In using this instrument it is absolutely essential that the air of the sleeping-apartment be as pure as the air outside to obtain normal or satisfactory results.

An unlimited number of persons may use the same instrument at the same time, providing the capacity of the instrument is suitable for the number of persons using it and the resistance of the main wire does not exceed one ohm between the farthest point used and the instrument.

This explains the theory of the instrument. Its construction is such that its use causes the least amount of inconvenience and reduces the expense of a low temperature, when required, to a minimum. The instrument is placed within a tube in the earth for several reasons. First, the moisture resulting from the melting ice assures a good ground connection, and when ice is not required the same object may be attained by pouring water in the tube, and, second, a most important feature in the successful use of the instrument is evenness of temperature either when ice is used or not. Being under ground when ice is used on account of the protection it melts slowly and the instrument retains a low temperature for hours after the ice has all melted. In using an instrument of this nature in a sleeping-room in summer-time ice is a necessity, and being surrounded by a high temperature it soon melts away, the temperature of the instrument rising rapidly, destroying its value or effectiveness.

The apparatus will now be described in detail, reference being made to the accompanying drawings, in which is illustrated an embodiment thereof.

In the drawings, Figure 1 illustrates my improved apparatus. Fig. 2 is a top view of the inner case containing the coil. Fig. 3 is a detail view of the same shown in vertical section.

Similar reference characters indicating corresponding parts in the views, let the numeral 5 designate an outer tube having its lower extremity open, its top being closed by a detachable cap $5^a$. This tube is set into the ground so that only its top protrudes, as shown in the drawings, the surface of the ground being designated by the numeral 6. Inclosed by the lower portion of this outer tube 5 is a case 7, containing a coiled plate 8, attached to the top of the case, which is completely inclosed and rests upon the ground, the lower end of the tube being open, as heretofore stated. To the top of this case 7 is made fast a post 9, to which is secured, by means of a binding-screw, one extremity of a metal conductor 10, which leads to one of the terminals $12^a$ of a rheostat 12. To the opposite terminal $12^c$ is attached one extremity of a metal conductor 13, whose opposite extremity leads to a number of non-corrosive metal disks 14, attached to a band 15, adapted to buckle around the limb of the person to be treated. Any desired number of persons may be connected with the same apparatus, provided the coil of plate 8 contains a sufficient surface area. I estimate that this plate should contain one square foot of surface for each individual using the apparatus. In Fig. 1 of the drawings I have shown an apparatus adapted for the use of two people, the rheostat 12 and the band 15 being exact duplicates of each other. In the left-hand portion of the figure the inside of this band is shown, while to the right the outside is exposed to show the connection with the disks, which are provided with lugs $14^a$, protruding through openings in the band, the wire 13 being attached on the outside, leaving the faces of the disks perfectly smooth where they engage the body. Considering the wire 10 as a main conductor, the wires leading to the rheostat-terminals 12 may be considered branches, which in the drawings are designated by the reference character $10^a$. Each rheostat is provided with a movable arm $12^d$, adapted to engage the contacts $12^g$ of the base $12^h$, whereby more or less resistance may be switched in as may be required in regulating the flow of current from the body of the person treated. The chamber A within the tube 5 above the case 7 may be filled with ice, if desired, for the purpose of properly reducing the temperature of the coil 8.

The apparatus is adapted for use while the person is asleep, and it is evident a house may be wired to accommodate any number of individuals all connected with the same apparatus.

The effectiveness of the instrument depends upon the surface area of the coil 8, because electricity travels on the surface of the conductor. By practice I have found that an instrument whose case and coil give an area of one square foot of surface for each individual connected therewith gives the most satisfactory results. Being of large surface area and being preferably sunk into the ground two feet, it retains a degree of temperature so much lower than the atmosphere in warm weather that it is not necessary to resort to the use of ice, except in extreme cases, to secure the desired result.

For each individual to be connected to the instrument one foot of additional surface must be added to the coil 8 in constructing the instrument, which may be made of any kind of metal; but a non-corrosive metal is desirable—such as copper, brass, &c.—which lasts indefinitely. The metal is chosen regardless of its position in the electropositive or electronegative series.

Having thus described my invention, what I claim is—

1. In an apparatus for removing electricity from the human system, the combination of a grounded metallic element possessing sufficient surface area, an electrical conductor leading from the said element, a metal contact attached to the body and connected with the opposite extremity of said conductor, and a rheostat interposed between the grounded element and the body for regulating the flow of the current.

2. In an apparatus for removing electricity from the human system, the combination of a tube sunk into the earth a suitable distance and open at its lower extremity, a case located in said tube in contact with the earth, a coiled plate located in said case and attached thereto, an electrical conductor leading from said case, a band adapted to be attached to the body, a metal contact attached to said band and connected with the opposite terminal of the conductor, and an interposed rheostat for regulating the flow of the current from the body.

In testimony whereof I affix my signature in presence of two witnesses.

JAMES W. SHRYOCK.

Witnesses:
OLIVE W. MALLABY,
LAURA H. SMITH.